(12) United States Patent
Horie et al.

(10) Patent No.: US 8,049,990 B2
(45) Date of Patent: Nov. 1, 2011

(54) CLEANING TAPE AND METHOD OF PRODUCING SAME

(75) Inventors: Yuji Horie, Tokyo (JP); Yasuyuki Yokota, Tokyo (JP); Jun Tamura, Tokyo (JP); Akihiro Sakamoto, Tokyo (JP); Noriyuki Kumasaka, Tokyo (JP)

(73) Assignee: Nihon Micro Coating Co., Ltd., Tokyo (JP)

( * ) Notice: Subject to any disclaimer, the term of this patent is extended or adjusted under 35 U.S.C. 154(b) by 358 days.

(21) Appl. No.: 12/241,420

(22) Filed: Sep. 30, 2008

(65) Prior Publication Data

US 2009/0092023 A1   Apr. 9, 2009

(30) Foreign Application Priority Data

Oct. 4, 2007   (JP) ................................. 2007-260594

(51) Int. Cl.
    *G11B 5/41* (2006.01)
(52) U.S. Cl. ....................................... 360/128
(58) Field of Classification Search ........................ None
    See application file for complete search history.

(56) References Cited

U.S. PATENT DOCUMENTS

| 5,847,905 | A  | * | 12/1998 | Inaba et al. ................... 360/128 |
| 5,991,127 | A  | * | 11/1999 | Thiessen ........................ 360/128 |
| 6,726,541 | B2 | * | 4/2004  | Nakamura et al. ............... 451/41 |
| 6,800,374 | B2 | * | 10/2004 | Honda et al. ................... 360/128 |
| 6,999,278 | B2 | * | 2/2006  | Honda et al. ................... 360/128 |
| 7,527,881 | B2 | * | 5/2009  | Ishiguro ........................ 428/838 |
| 2004/0137833 | A1 | * | 7/2004  | Murao et al. ................... 451/307 |
| 2006/0066999 | A1 | * | 3/2006  | Ejiri ............................. 360/128 |

* cited by examiner

*Primary Examiner* — Mark Blouin
(74) *Attorney, Agent, or Firm* — Weaver Austin Villeneuve & Sampson LLP

(57) ABSTRACT

A cleaning tape has a base tape made of a synthetic resin and a cleaning layer formed on a surface of this base tape. The cleaning layer has a binding agent and a large number of spherical particles dispersed in the binding agent in a single particle layer. Such a cleaning tape is capable of removing very small unwanted protrusions and particles on the surface of a target object such as a magnetic hard disk without forming scratches.

8 Claims, 5 Drawing Sheets

CLEANING TAPE AND METHOD OF PRODUCING SAME

This application claims priority on Japanese Patent Application 2007-260594 filed Oct. 4, 2007.

BACKGROUND OF THE INVENTION

This invention relates to a cleaning tape for removing unwanted protrusions formed on the surface of a target object for cleaning (or a device substrate) such as a magnetic hard disk, a magnetic head, a semiconductor wafer, a liquid crystal panel or an optical lens, foreign objects such as oily matters attached to the surface of a work piece or stains like oily matters attached to the surface of a target object of cleaning, as well as a method of producing such a cleaning tape. In particular, the invention relates to a burnishing and wiping technology suitable for removing dust attached to the surface of a magnetic disk or a liquid crystal panel or abnormal protrusions formed in a thin-film process.

Devices such as computers, television sets, cameras and telephones are constantly being required to improve their functional properties (such as increased capacity for recording data such as sounds and images and improved smoothness and cleanliness in the case of an image screen (such as a liquid crystal panel) and a camera lens). With such apparatus, it is essential to produce each of the components that comprise the apparatus exactly as designed so as to exhibit the characteristics intended at the design stage.

For example, magnetic hard disks are widely being used as a medium for recording data. Such magnetic hard disks are produced by carrying out a series of surface processing processes such as lapping, polishing and texturing on a non-magnetic substrate such as an aluminum substrate, a glass substrate or a silicon substrate having a Ni—P plating film formed on the surface, and thereafter forming a magnetic recording layer and a diamond-like carbon (DLC) film as a protective film on this magnetic recording layer.

After the protective film is formed in the sequence of the processes described above, its surface is cleaned in order to remove the unwanted protrusions formed on the surface of the protective film and the particles such as dust particles attached to the surface of the protective film.

This cleaning process is generally carried out by using a polishing tape with fixed abrading particles. After this cleaning process, the surface of the protective film is coated with a lubricant of perfluoropolyester type to form a lubricating film, and another cleaning process is carried out for removing attached objects such as dust which have come to become attached to the surface of the lubricating film.

The cleaning process which is carried out for the lubricating film is also carried out by using a polishing tape with fixed abrading particles, as for the cleaning process done for the protective film. These cleaning processes may be carried out each after the Is formation of the protective film or only at the final stage (after the formation of the lubricating film).

As a polishing tape with fixed abrading particles (or a cleaning tape) for removing unwanted protrusions and foreign objects like dust particles attached to the surface, as described above, it has been known (as disclosed, for example, in Japanese Patent Publications Tokkai 8-267364, 9-85628, 10-71572 and 10-114837) to use lapping tapes having hard particles such as alumina ($Al_2O_3$) particles, SiC particles and diamond particles fastened to the surface of a base tape made of a synthetic resin such as polyethylene terephthalate and polyamide with a resin material.

Although the relatively hard abrading particles for such polishing tapes with fixed abrading particles (or lapping tapes) which have been in use are capable of removing unwanted protrusions from the surface of a film after the film-forming process, there is a problem in that they cannot sufficiently remove the particles which become attached to the surface of the film after being formed and may even cause scratches on the film surface due to the particles that fall off the polishing layer. In other words, they cannot satisfy the requirement for high degrees of cleanliness and high quality imposed on magnetic hard disks.

In view of this requirement, Japanese Patent Publications Tokkai 8-19965 and 2002-224966 have disclosed cleaning tapes (wiping tapes) using plastic particles for controlling the generation of scratches, and Japanese Patent Publication Tokkai 2001-138249 has disclosed a method of using a foamed sheet for cleaning.

Although these methods are effective in reducing scratches, they are not sufficient for the removal of small protrusions and attached objects, and there remained the problem of poor cleaning effect. It is in particular to be noted that extremely small protrusions (inclusive of foreign objects that are strongly attached to the surface of a substrate) and scratches which have been ignored as being within the range of design error are coming to be not negligible in the production of high-capability devices in the field of high-density recording (and in particular in the field of perpendicular magnetic recording).

Because of the progress in the fabrication technology and thin-film technology for the production of magnetic hard disks, together with the requirement for high levels in cleanliness and quality, the quantity of particles that become strongly attached and Is unwanted protrusions as before is decreasing. On the other hand, however, a new requirement is appearing for cleaning technology for removing even smaller particles and not generating smaller scratches (such as so-called micro-defects).

With a conventional cleaning tape, however, it was not possible to carry out highly efficient clearing or to remove very small particles because the whole of the abrading particles of the cleaning layer does not effectively contact the surface of the target object to be cleaned when it was applied to it (or its abrading particles do not effectively function).

SUMMARY OF THE INVENTION

It is therefore an object of this invention in view of the problem as described above to provide a cleaning tape capable of effectively removing unwanted fine protrusions and particles from the surface of a target object to be cleaned so as to clean the surface of the target object, as well as a method of producing such a cleaning tape.

A cleaning tape according to this invention in view of the object described above comprises a base tape made of a synthetic resin and a cleaning layer formed on a surface of this base tape, wherein the cleaning layer comprises a binding agent and a large number of spherical particles dispersed in the binding agent in a single particle layer.

Since the spherical particles contained in the cleaning layer are dispersed into a single particle layer (hereinafter sometimes simply referred to as the single layer), the level differences among the spherical particles on the outer surface of the cleaning layer become uniform, and hence the contact to the target object for cleaning becomes more effective. It was initially feared that bond between the binding agent (the binder resin) and the spherical particles might be too weak in the single layer and the particles might drop off but it has become clear that the binding agent gathers around the spherical particles due to the surface tension of the binding agent such that the bond becomes rather stronger.

Since the particles that are used are spherical, furthermore, it becomes easier to reduce the generation of minute scratches and to effectively remove unwanted protrusions and excess oil components.

When the target object to be cleaned is a magnetic hard disk having a lubricating film formed on its surface, in particular, it becomes possible not only to remove unwanted protrusions and particles from the surface of the lubricating film without forming micro-scratches (micro-defects) on the surface of the lubricating film but also to remove excess oil components on the surface of the lubricating film.

These spherical particles need not be completely spherical but may include approximately spherical ones and oblate ones. In the above, to be dispersed in a single layer means to be distributed on the surface of the base tape without overlapping because a single particle layer, or a single layer, is formed.

It is preferable for the single particle layer in the cleaning layer to contain so-called pocket parts scattered in dotted manners, these pocket parts being parts where no spherical particles are contained and formed between aggregates of spherical particles. These pocket parts surrounded by aggregates of spherical particles serve to improve the efficiency with which unwanted protrusions and particles can be removed.

It is also preferable that the spherical particles have an areal density of 50% or more and 80% or less on the surface of the base tape. If the areal density is less than 50%, distances between the particles become too large and the cleaning efficiency becomes low. If it is over 80%, the pocket parts between the particles become too few and the tape tends to become clogged too easily. This gives rise to the problem of the binding agent of the cleaning layer becoming attached.

The thickness of the cleaning layer is preferably 1.05 times or more and 1.3 times or less the average diameter of the spherical particles. If it is less than 1.05 times the average diameter of the spherical particles, the adhesive force between the spherical particles and the binding agent becomes too weak and the spherical particles begin to drop off, increasing the amount of particles to be removed. If it exceeds 1.3 times the average diameter of the spherical particles, on the other hand, the spherical particles tend to overlap to form two layers or more, increasing the level differences in the unevenness such that the efficiency in the cleaning is adversely affected because the number of effective contacting abrading particles decreases when the surface of the cleaning tape contacts the surface of the target object to be cleaned.

The diameters of the spherical particles are preferably in the range of 0.1 µm or more and 200 µm or less. For the cleaning of the surface of a magnetic hard disk, the practical range is 1.0 µm or more and 20 µm or less. If the diameters are less than 0.1 µm, the number of agglomerated particles increases and it becomes difficult to have a single layer arranged while, if the diameters are greater than 200 µm, the pitch between the particles becomes too large and the cleaning becomes uneven.

In the cleaning layer containing the spherical particles and the binding agent, the spherical particles are contained preferably at a ratio of 50 weight % or more and 80 weight % or less. If this ratio is less than 50 weight %, the cleaning efficiency drops. If it is over 80 weight %, the pockets become too few and the clogging begins to occur too frequently such that it becomes impossible to continue the cleaning. Moreover, there will appear more portions where the particles overlap to form two or more layers such that it will no longer be a single particle layer.

The size distribution of the spherical particles is preferably such that the ratio of D10 and D90 with respect to the average diameter D50 is 1/10 or greater.

These spherical particles may be organic and/or inorganic particles. The use of organic and inorganic particles can be appropriately selected according to the cleaning accuracy of the surface of the target object to be cleaned, the foreign objects to be removed, the conditions of such foreign objects, etc. Materials for organic particles include crosslinked acryl resins, crosslinked polystyrene resins, melamine resins, phenol resins, epoxy resins, urea resins and polycarbonates. Materials for inorganic particles include ceramics, glass and carbon.

The selection of the size distribution and the range of diameters of the spherical particles, the ratio between the spherical particles and the binding agent, the thickness of the cleaning layer and the material of the spherical particles must be made such that the effective contact surface of the spherical particles will be 70% or over when the cleaning tape is in contact with the surface of the target object for cleaning such that the cleaning accuracy can be maintained at a desired level.

The surface of a target object to be cleaned such as a magnetic hard disk, a liquid crystal panel or a semiconductor wafer or the end surface of optical fibers is cleaned according to this invention. The cleaning is carried out by pressing a cleaning tape of this invention on the surface of the target object for cleaning and causing a relative motion between the target object for cleaning and the cleaning tape.

If the target object for cleaning is a magnetic hard disk, for example, the cleaning of its surface is carried out by rotating the magnetic hard disk, pressing the surface of the cleaning layer of the cleaning tape of this invention on the surface of this magnetic hard disk and running this cleaning tape in the direction opposite to the direction of rotation of the magnetic hard disk.

According to the invention, the surface of a magnetic hard disk substrate and the surfaces of the films formed sequentially on the surface of this substrate (the magnetic film, the protective film and the lubricating film) can be cleaned during the production process of the magnetic hard disk.

The cleaning tape of this invention can be used also in the intermediate processes of the production process. When the magnetic film and the protective film formed by a thin-film technology are cleaned, for example, the tape can be used for the process called burnishing for removing abnormal protrusions which appear at the time of forming a thin film or substances that have become attached. It can also be used for the process of wiping off unwanted particles that have accumulated on the surface of the substrate. It can further be used for removing excess oil components which have been used for smoothing the surface of the lubricating layer.

This invention further relates to a method of producing a cleaning tape comprising a base tape made of a synthetic resin and a cleaning layer formed on a surface of this base tape. The method of this invention comprises the steps of forming a cleaning layer by coating a base tape with a coating solution containing an organic solvent and a large number of spherical particles in a binding agent such that the spherical particles are dispersed to form a single particle layer and hardening the formed cleaning layer.

The step of hardening the cleaning layer in the method of this invention is characterized as including the step of causing the spherical particles to move inside the coating solution to form and to harden aggregates.

Explained more in detail, it is a method of applying the spherical particles to the cleaning layer so as to become dispersed in a single particle layer, and it is preferable that the spherical particles be contained at a ratio of 55 weight % or more and 80 weight % or less of the sum of the binding agent and the spherical particles and that the binding agent and the spherical particles have a total concentration of 25 weight % or less in the coating solution.

If the concentration of the coating solution becomes 25 weight % or greater, its surface tension becomes too great in the hardening process, the spherical particles agglomerate in two or more layers at the time of their convection. Even when the concentration of the coating solution is 25 weight % or less, if the spherical particles are 55 weight % or more with respect to the sum of the binding agent and the spherical particles, cohesion takes place similarly and it becomes difficult for the spherical particles to disperse in a single particle layer. If the concentration is 80 weight % or over, the spherical particles disperse in a single layer but number of pockets among the aggregates of the particles becomes small.

The concentration with respect to the binding agent and the spherical particles may be 50 weight % or greater and 70 weight % or less and the concentration of the sum of the binding agent and the spherical particles in the coating solution may be about 20 weight %, depending on the type of the target object to be cleaned.

Being characterized as described above, the present invention has the effect of being capable of removing unwanted protrusions and particles from the surface of a target object for cleaning such as a magnetic hard disk and to clean the surface of the target object without forming scratches on the surface of the target object.

Another effect of the invention for cleaning the surface of a magnetic hard disk having a lubricating film formed on its surface is that it is possible not only to remove unwanted protrusions and particles from the surface of the lubricating film without forming any scratches (or micro-defects) on the surface of the lubricating film but also to remove excess oil components from the surface of the lubricating film.

The effects of the invention described above can be realized by the production method described below.

The cleaning tape according to this invention is obtained by coating the surface of a soft film material with spherical particles with a coating agent so as to be dispersed in a single layer, and the spherical particles which are shaped so as not to generate scratches have good fluidity and can be dispersed in a single layer easily as the viscosity of the coating solution is appropriately adjusted.

If spherical particles which are uniform in size are used, furthermore, the surface of the cleaning layer having these particles dispersed in a single layer can be made flat. As a result, the number of abrading particles contacting the surface of the target object for cleaning can be increased such that particles can be removed efficiently.

DETAILED DESCRIPTION OF THE INVENTION

Figure 1:
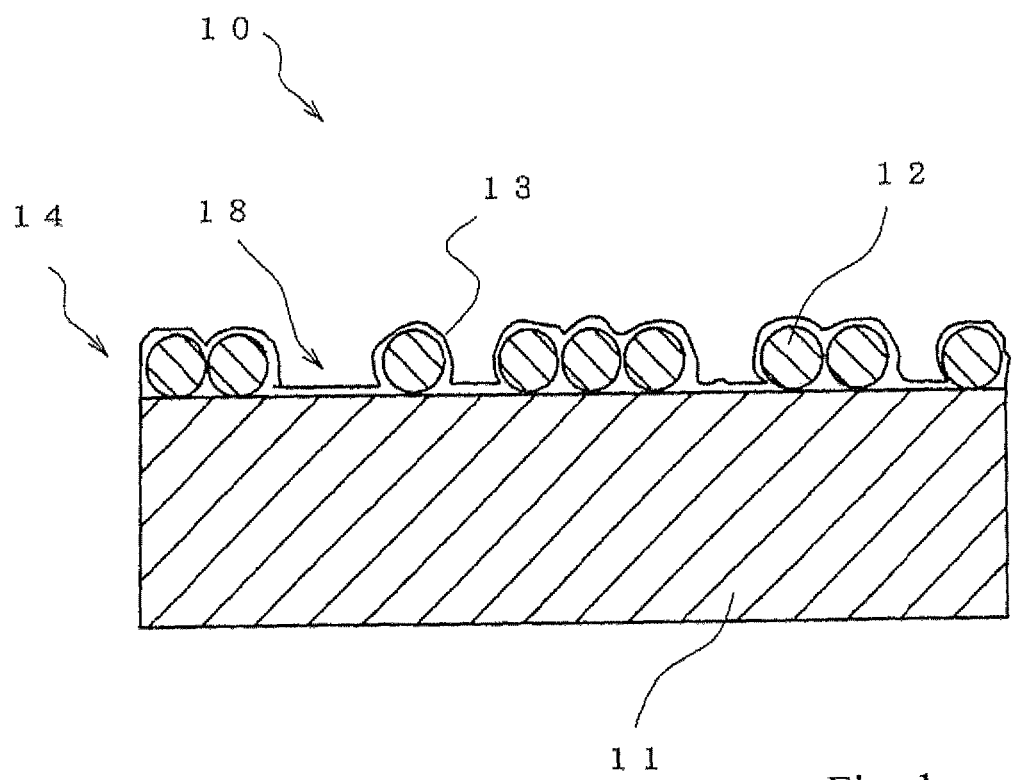
FIG. 1 is a schematic sectional view of a cleaning tape embodying this invention.

FIG. 1 is a schematic sectional view of a cleaning tape 10 embodying this invention, comprising a base tape 11 made of a synthetic resin material and a cleaning layer (or polishing layer) 14 formed on the surface of this base tape 11. The cleaning layer 14 has spherical particles 12 arranged in a single layer, having these spherical particles 12 fastened to their positions by a binding agent (resin) 13.

The spherical particles 12, arranged in a single layer, form a plurality of aggregates, providing between these aggregates so-called pockets 18 (hereinafter also referred to as pocket parts) not containing any of these spherical particles 12. These pockets 18 are generated when a coating solution comprising the spherical particles 12, the binding agent 13 and an organic solvent is applied to the base tape 11 and is thereafter formed into the cleaning layer 14 through drying and hardening processes, as the spherical particles 12 form these aggregates by the surface tension. The pockets 18 appear scattered in a dotted form and their depths are about the same as the diameters of these spherical particles 12, as shown in FIG. 1.

A plastic film made of a synthetic resin material is used for the base tape 11 because it is required to be resistant against breakage and deformation due to a mechanical force which may act thereon during its use (by having high strength and heat-resistance) and also to be flexible.

Examples of material for the plastic film include polyester resins such as polyethylene terephthalate, polybutylene terephthalate and polyethylene naphthalate, polyolefin resins such as polyethylene and polypropylene, polystyrene, vinyl polychloride, acryl resins having polyvinyl alcohol or methacryl alcohol as main component and polycarbonates.

As a practical matter, however, it is preferable to use a plastic film of polyethylene terephthalate as the base tape because of its ease for handling in the production of the cleaning sheet.

From the point of view of the mechanical characteristics, it is preferable to use as the base tape a plastic film having bending elasticity of 500 kg/mm$^2$ or more and 2000 kg/mm$^2$ or less by using test piece of 1 mm in thickness by a test method according to JISK6911 (Japanese Industrial Standard).

These is no particular limitation on the thickness of the base tape 11 but it is preferably 5 µm or more and 100 µm or less, or more preferably 10 µm or more and 75 µm or less.

According to this invention, spherical particles are used as abrading particles for acting on foreign objects and excess oil components attached to the surface of a target object and also very small unwanted protrusions formed on the surface of the target object in order to remove such foreign objects and excess oil components as well as very small protrusions (by trimming the surface of the target object) without generating scratches during a cleaning process.

Examples of such spherical particles to be used according to this invention include organic particles of crosslinked acryl resins, crosslinked polystyrene resins, melamine resins, phenol resins, epoxy resins, urea resins and polycarbonates, and inorganic particles of ceramics, glass and carbon.

Spherical particles are used for the cleaning according to this invention for reducing the possibility of forming scratches on the surface of the target object and attachment of pieces of particles broken off during the cleaning process as foreign objects onto the surface of the target object.

The selection of organic and inorganic particles is made appropriately according to the required cleaning accuracy of the surface of the target object to be cleaned, the foreign objects to be removed and the condition of such foreign objects.

Examples of the binding agent (resin) 13 shown in FIG. 1 and serving as the coating agent for fastening the spherical particles 12 in the cleaning layer (polishing layer) 14 include thermoplastic resins that are generally used for a polishing tape with fixed abrading particles, thermosetting resins, reactive resins, electron beam-hardening resins, infrared light-hardening resins, visible light-hardening resins and mixtures of these resins.

The cleaning tape of this invention can be produced by using a coating solution comprising the aforementioned spherical particles and binding agent (resin) and an organic solvent and coating the surface of the base tape in a single layer. The spherical particles are suited also for the coating to apply the abrading particles in a single layer.

Spherical particles with average diameter of 0.1 μm or more and 200 μm or less are used but those with average diameter of 0.5 μm or more and 10 μm or less are preferable. If the average diameter is less than 0.1 μm, the particles do not have a sufficient adhesive force. If the average diameter is greater than 200 μm, on the other hand, the intervals between the unevenness and between the particles on the surface of the cleaning layer become too large and very small particles cannot be removed. It also has the effect of increasing the number of scratches.

The thickness of the cleaning layer is preferably 1.05 times or more and 1.3 times or less the average diameter of the spherical particles. If it is less than 1.05 times the average diameter of the spherical particles, the adhesive force between the particles and the coating solution becomes insufficient, the spherical particles begin to drop off and the number of particles comes to increase. If the thickness is more than 1.3 times the average diameter of the spherical particles, on the other hand, the spherical particles come to overlap in two or more layers, the unevenness increases and since the number of effective abrading particles comes to decrease when the surface of the cleaning tape contacts the surface of the target object to be cleaned, the cleaning efficiency is adversely affected.

As for the method of applying the coating solution having the spherical particles dispersed therein, a blade coater, a gravure coater, a knife coater, a reverse roll coater, a cast coater, a kiss roll coater, a spray coater, a curtain coater, an electrostatic powder coater, and electric depositing coating may be used.

When any of these methods is used, the viscosity of the coating solution is adjusted appropriately. The viscosity of the coating solution is preferably within the range of 5-200 cps for the purpose of dispersing the spherical particles in a single layer.

If a coating solution with spherical particles mixed with a binding agent is not used, the binding agent may be initially applied to the base film in order to obtain a result similar to that obtainable by using a coating solution as described above. When this method is used, spherical particles with diameters within the same range as described above may be used but this method is particularly preferable when particles with average diameter of 50 μm or more are used.

The cleaning tape 10 shown in FIG. 1 can be produced by a method as described below.

Figure 3:
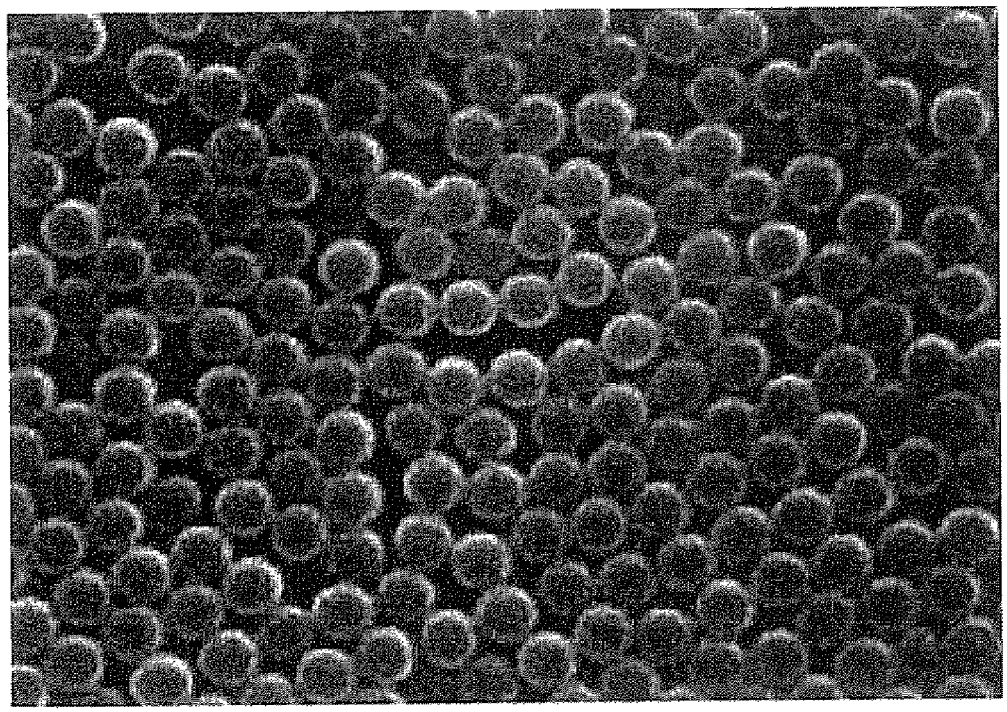
FIG. 3 is an example of image of spherical particles used for a cleaning tape of this invention, observed by a scanning electron microscope (SEM).

To start, the binding agent and the spherical particles are mixed together and after this mixture is stirred, an organic solvent is added to this mixture of the binding agent and the spherical particles to obtain a resin solution having the spherical particles dispersed. FIG. 3 is an example of image of spherical particles observed by a scanning electron microscope (SEM).

Next, after this resin solution is filtered, a hardening agent is added while this resin solution is being stirred, and an organic solvent is further added to it until a desired level of viscosity is reached to obtain a coating solution.

Next, this coating solution is applied to the surface of the base film 11 (shown in FIG. 1) and is dried to be hardened. This is slit into a desired width to produce a cleaning tape of this invention as shown at 10 in FIG. 1.

In the above, any conventionally known binding agents may be used as the hardening agent such as thermoplastic resins, thermosetting resins, reactive resins, violet light-hardening resins, electron beam-hardening resins, visible light-hardening resins and their mixtures.

Examples of the organic solvent that can be used include ketones such as acetone, methylethyl ketone and cyclohexane, alcohols such as methanol, ethanol, propanol, butanol, isobutyl alcohol and isopropyl alcohol, esters such as methyl acetate, ethyl acetate, butyl acetate and isopropyl acetate, ethers such as diethylether, tetrahydrofuran and glycol dimethylether, tars (aromatic monovalent hydrogen) such as benzene, toluene and xylene, and their mixtures.

In order that the spherical particles can be easily dispersed in a single layer after the coating solution is applied, the coating solution should be such that the spherical particles are contained with respect to the sum of the binding agent and the spherical particles at a ratio of 55 weight % or more and 80 weight % or less and the organic solvent is added to this mixture of spherical particles and the binding agent (a solid resin) such that the concentration of this mixture is 25 weight % or less.

With the mixing ratios thus adjusted, the spherical particles in the applied cleaning layer can move within the layer during the hardening process (by heat, ultraviolet irradiation, etc.) to become solid while forming aggregates.

During the hardening process, furthermore, the surface tension of the binding agent operates such that the binding agent tends to gather around the spherical particles and the spherical particles form not only aggregates but also a single particle layer, becoming strongly fastened in the form of the base tape. In this process, the pockets containing no spherical particles come to exist dispersed in a dotted form between the aggregates of the spherical particles.

Figure 8:
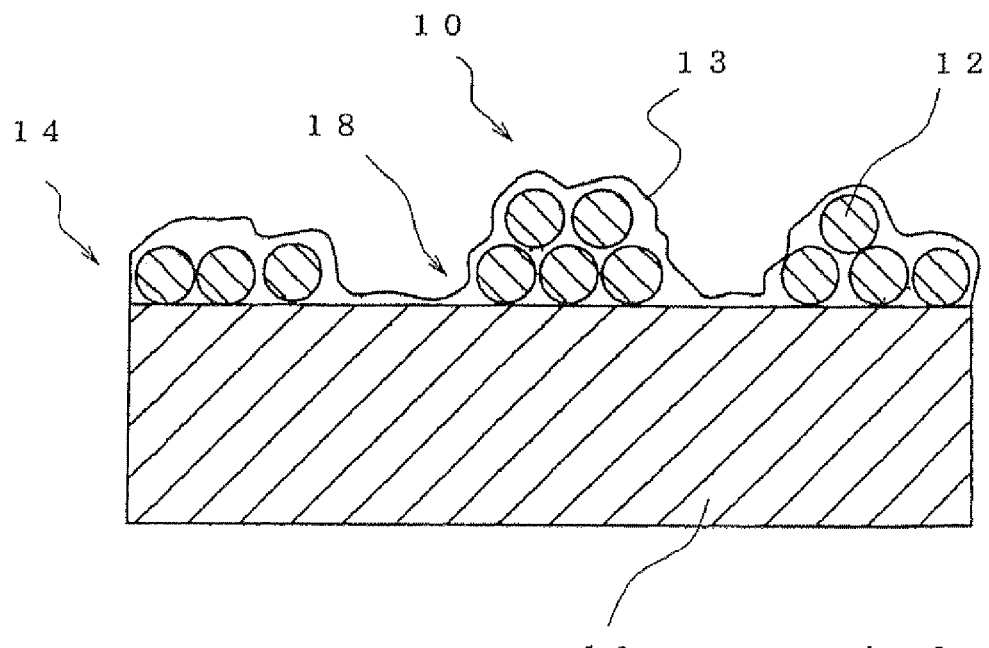
FIG. 8 is a schematic sectional view of a cleaning tape with spherical particles not dispersed in a single layer.

If the ratio of spherical particles with respect to the sum of the binding agent and Is the spherical particles or the concentration with respect to the organic solvent is not within the favorable range described above, the spherical particles 12 fail to disperse so as to form a single particle layer, and portions with overlapping layers come to be mixed, as shown in FIG. 8. In such a situation, the contact with the target object to be cleaned becomes less than ideal.

According to this invention, the surfaces of target objects such as a magnetic hard disk, its substrate, a magnetic head, end surfaces of optical fibers, a semiconductor wafer and a liquid crystal panel are cleaned.

The surface of a target object is cleaned by pressing a cleaning tape of this invention described above onto the surface of the target object and moving the target object and the cleaning tape relative to each other.

Figure 2:
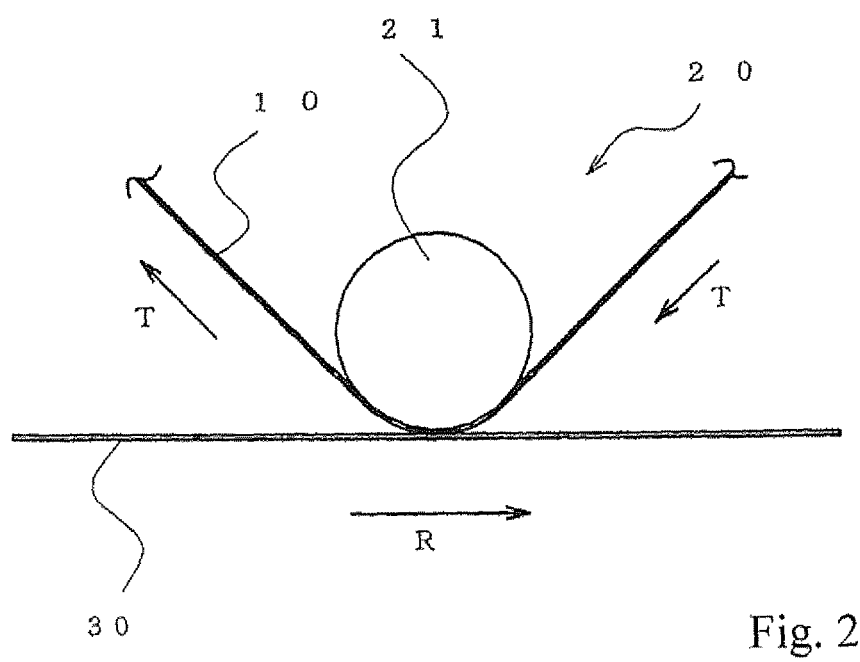
FIG. 2 is a schematic diagram for showing a cleaning method using a cleaning tape of this invention.

If the target object to be cleaned is a magnetic hard disk having a lubricating film on its surface, for example, its surface with the lubricating film may be cleaned, as shown schematically in FIG. 2, by rotating the magnetic hard disk 30 in the direction of arrow R, pressing the surface of the cleaning layer 14 of the cleaning tape 10 of this invention onto the surface of the lubrication film of this magnetic hard disk 30 through a contact roller 21, and running this cleaning tape 10 in the direction shown by arrow T opposite to the direction of rotation of the magnetic hard disk 30 shown by arrow R.

A cleaning tape embodying this invention was produced as follows by using materials shown in Table 1 below.

TABLE 1

| | Main component | Content (weight %) |
|---|---|---|
| Abrading particles | Crosslinked acryl spherical particles | 70.0 |
| Resins | Binding agent A | 22.5 |
| | Binding agent B | 3.0 |
| | Binding agent C | 4.5 |

(Coating solution is obtained by mixing the abrading particles and Binding agents A, B and C with an organic solvent.)
(Abrading particles) (Average diameter = 10 μm)
Product name: MBX-10SS produced by Sekisui Kaseihin Kogyo Kabushiki Kaisha (Average diameter = 5 μm)
Product name: MX-500 produced by Soken Kagaku Kabushiki Kaisha (Average diameter = 1 μm)
Product name: MBX-2H produced by Sekisui Kaseihin Kogyo Kabushiki Kaisha (Binding agent A) (Molecular weight = 23,000)
Product name: Byron 300 produced by Toyo Boseki Kabushiki Kaisha (Binding agent B) (Molecular weight = 17,000)
Product name: Byron 200 produced by Toyo Boseki Kabushiki Kaisha (Binding agent C)
Product name: 1BarnockD750 produced by Dai Nippon Inki Kagaku Kogyo Kabushiki Kaisha
(Organic solvent): Commercially available methylethyl ketone.

TEST EXAMPLE 1

Single Layer of Spherical Particles with Average Diameter 10 μm

Cleaning tapes of Test Example 1 were produced as follows.

To start, specified amounts of Binding agents A and B and the organic solvent were prepared and placed in a tank. While Binding agents A and B were stirred, spherical particles (crosslinked acryl particles with average diameter 10 μm) were added as abrading particles and stirred for about 30 minutes to produce a resin solution containing spherical particles. FIG. 3 shows an image of spherical particles by a scanning electron microscope (SEM). Crosslinked acryl particles with average diameter D50 of 10 μm were used as the spherical particles and their size distribution was such that the ratios of D10 and D90 with respect to D50 were 1/50.

Next, after a disperser was used to sufficiently disperse the spherical particles inside this resin solution, a 30 μm-filter was used to remove foreign objects from this resin solution.

Next, a hardening agent (Binding agent C) was added while this resin solution was stirred, and a coating solution was produced by adding an organic solvent (methylethyl ketone) until a specified concentration level of 20% was reached. The resin content in this coating solution was the same as shown in Table 1.

The concentration and mixing ratios of this coating solution are shown in Table 2 below.

TABLE 2

| | Content (weight %) | Content (weight %) |
|---|---|---|
| Abrading particles (crosslinked acryl spherical particles) | 70 | 20.0 |
| Binding agent A | 22.5 | |
| Binding agent B | 3.0 | |
| Binding agent C | 4.5 | |
| Organic solvent | | 80.0 |

Next, a reverse coater was used to coat the surface of a polyethylene terephthalate (PET) film of thickness 25 μm with this coating solution. The thickness of this coating solution (the thickness of the coating cloth) was about 40 μm.

Next, a drying furnace was used to dry and harden the coating solution which had been applied to the surface of the PET film so as to form a cleaning layer on the surface of the PET film. The thickness of the cleaning layer after the drying process was about 11 μm.

Figure 5:
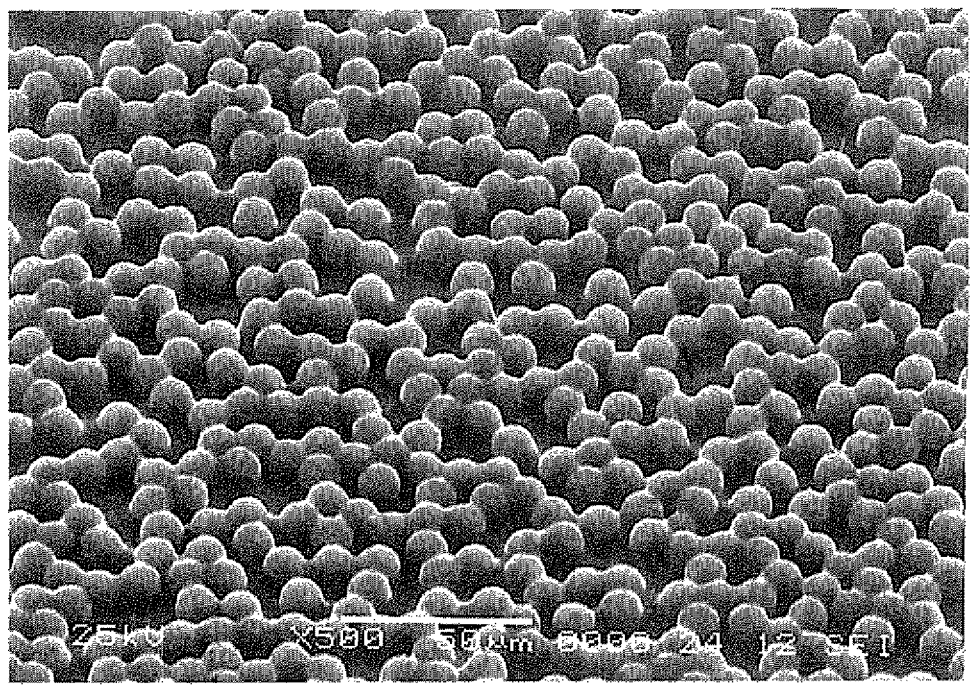
FIG. 5 is an image of the surface of a cleaning tape produced in Test Example 1 taken by a scanning electron microscope.

Lastly, the cleaning film with the cleaning layer formed on its surface was cut to a specified width to obtain the cleaning tape of Test Example 1. FIG. 5 shows an image of the surface of this cleaning tape of Test Example 1 taken by a scanning electron microscope.

TEST EXAMPLE 2

Single Layer of Spherical Particles with Average Diameter 5 μm

Cleaning tapes of Test Example 2 were produced. Cleaning tapes of Test Example 2 were produced identically to cleaning tapes of Test Example 1 except that spherical particles of average diameter 5 μm were used as the spherical particles and the coated thickness of the abrading particles was about 20 μm. The thickness of the cleaning layer after the drying process was about 6 μm.

TEST EXAMPLE 3

Single Layer of Spherical Particles with Average Diameter 1 μm

Cleaning tapes of Test Example 3 were produced. Cleaning tapes of Test Example 3 were produced identically to cleaning tapes of Test Example 1 except that spherical particles of average diameter 1 μm were used as the spherical particles and the coated thickness of the abrading particles was about 4 μm. The thickness of the cleaning layer after the drying process was about 1.2 μm.

COMPARISON EXAMPLE 1

Conventional Tapes with Multi-Layer of AWA with Average Diameter 1 μm

Cleaning tapes of Comparison Example 1 were produced. Cleaning tapes of Comparison Example 1 were produced identically to cleaning tapes of Test Example 1 except that ordinary (non-spherical) alumina ($Al_2O_3$) particles with average diameter 1 μm were used as abrading particles and the coated thickness of the abrading particles was 6 μm.

COMPARISON EXAMPLE 2

Multi-Layered Spherical Particles with Random Diameters

Figure 4:
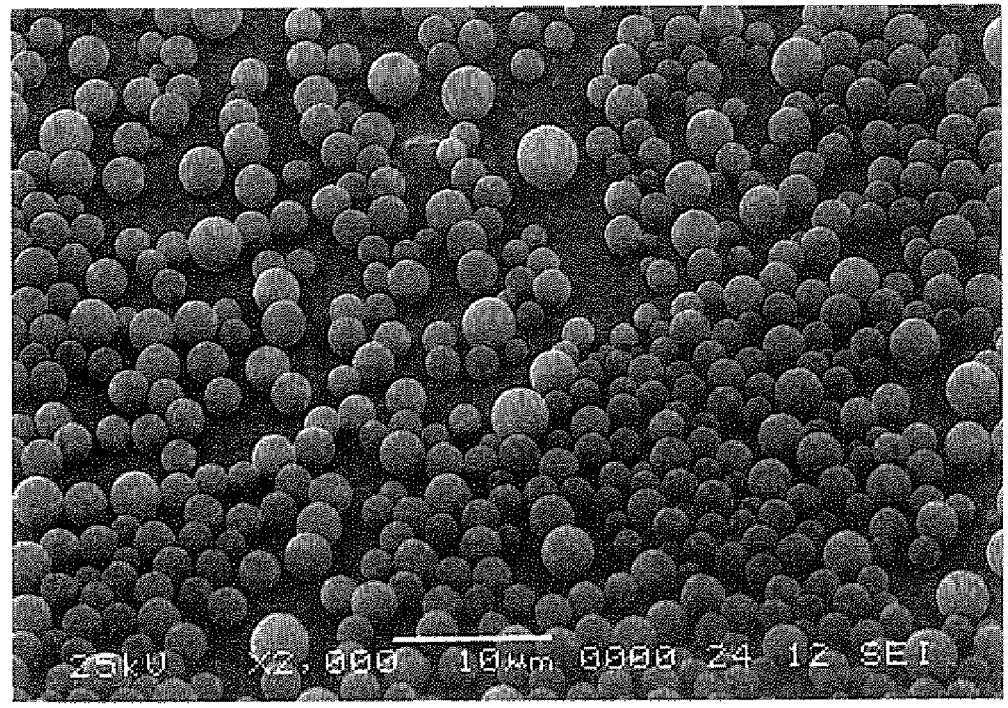
FIG. 4 is an SEM image of spherical particles having random diameters with small and large particles mixed together.

Cleaning tapes of Comparison Example 2 were produced. For Cleaning tapes of Comparison Example 2, the average diameter D50 of the abrading particles was 2 μm and the ratios of D10 and D90 with respect to D50 were about 1/5, the diameters having a broader distribution. In other words, as shown in FIG. 4, small and large spherical abrading particles were randomly distributed. Cleaning tapes of Comparison Example 2 were produced identically to cleaning tapes of Test Example 1 except that the coated thickness of the coating solution was about 80 μm. The thickness of the cleaning layer after the drying process was about 20 μm.

Figure 6:
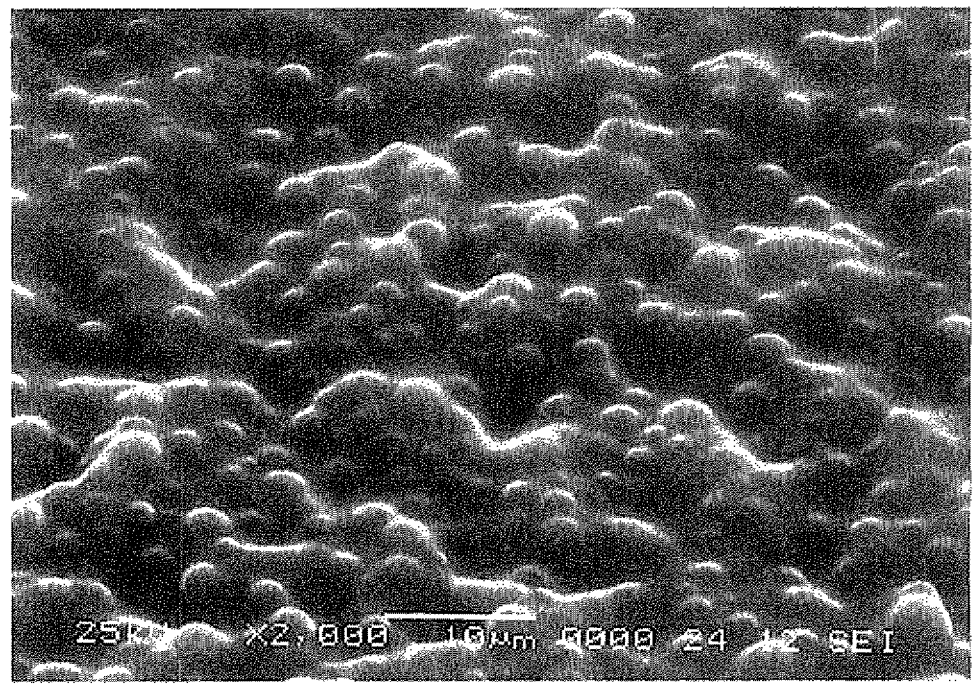
FIG. 6 is an SEM image of the surface of a cleaning tape produced in Comparison Example 2.
Figure 9A:
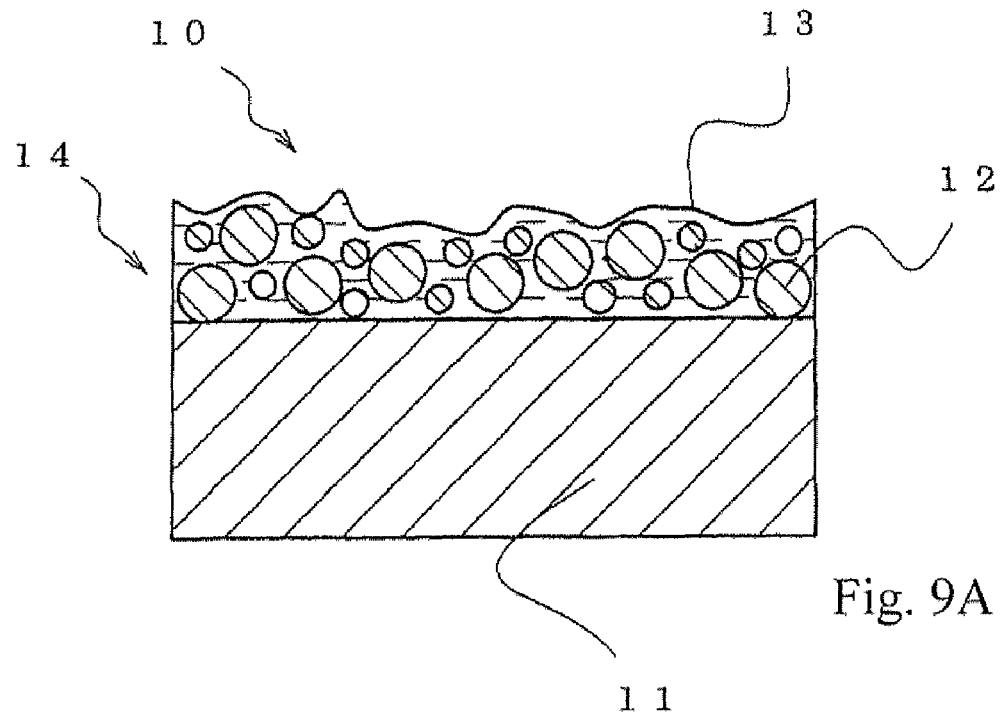
FIG. 9A is a schematic sectional view of a cleaning tape of Comparison Example 2.

FIG. 6 is an SEM image of the surface of a cleaning tape produced in Comparison Example 2. FIG. 9A is a schematic sectional view of a cleaning tape produced in Comparison Example 2, having small and large particles mixed together.

COMPARISON EXAMPLE 3

Multi-Layered Spherical Particles with Average Diameter 5 μm

Figure 7:
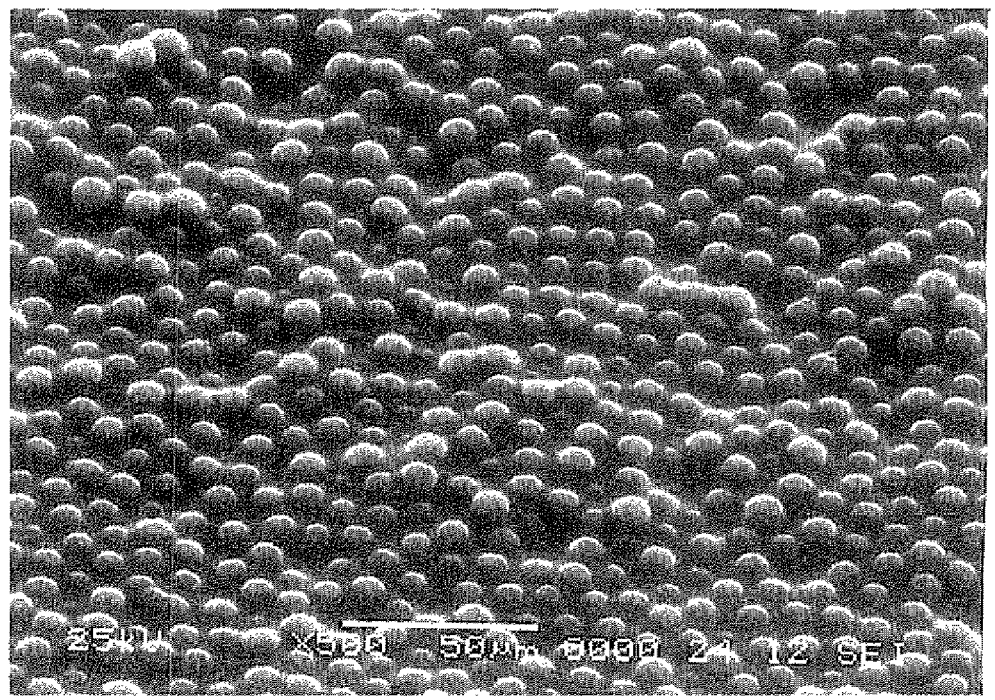
FIG. 7 is an SEM image of the surface of a cleaning tape produced in Comparison Example 3.
Figure 9B:
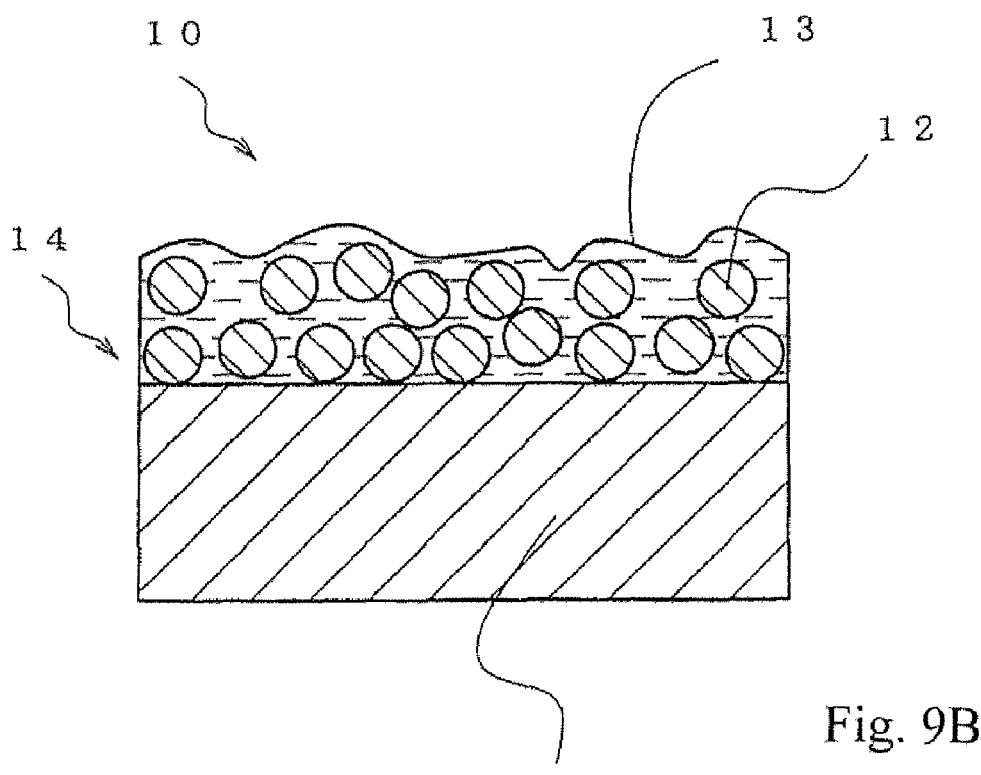
FIG. 9B is a schematic sectional view of a cleaning tape of Comparison Example 3.

Cleaning tapes of Comparison Example 3 were produced. Cleaning tapes of Comparison Example 3 were produced identically to cleaning tapes of Test Example 1 except that the average diameter D50 of the abrading particles was 5 μm and the coating thickness of the coating solution was about 40 μm. The thickness of the cleaning layer after the drying process was about 11 μm. FIG. 7 is an SEM image of the surface of a cleaning tape produced in Comparison Example 3. Structures of the cleaning layers of the cleaning tapes of Test and Comparison Examples are shown in Table 3. FIG. 9B is a schematic sectional view of a cleaning tape of Comparison Example 3 with spherical particles dispersed in a plurality of layers.

TABLE 3

| Diameter distribution of abrading particles | D50 (μm) | D10/D50 | D90/D50 | Thickness of coated cloth (μm) |
|---|---|---|---|---|
| Test Example 1 | 10 | 1/50 | 1/50 | 11 |
| Test Example 2 | 5 | 1/50 | 1/50 | 5 |
| Test Example 3 | 1 | 1/50 | 1/50 | 1.2 |
| Comparison Example 1 | 1 | 1/50 | 1/50 | 6 |
| Comparison Example 2 | 2 | 1/5 | 1/5 | 5 |
| Comparison Example 3 | 5 | 1/5 | 1/5 | 11 |

Cleaning tapes of Test and Comparison Examples were used to compare the surface conditions of magnetic disks (removal of protrusions and particles and presence or absence of scratches). Glass substrates of 2.5 inches in diameter with a ground (base) layer, a magnetic layer, a protective film and a lubricating film formed sequentially thereon were used as the magnetic hard disks.

As the comparison test, five of such magnetic hard disks were cleaned by using cleaning tapes each of Test and Comparison Examples under the conditions shown in Table 4 below. The surfaces of the magnetic hard disks (or their lubricating films) were cleaned by using a cleaning device as shown in FIG. 2 (Product name: 1 Auto-loading Tape Burnish; Product number: IALTB-100TC, produced by Nihon Micro Coating Kabushiki Kaisha).

TABLE 4

| | |
|---|---|
| Rotational speed of disk | 600 rpm |
| Pressure by contact roll | 120 g |
| Hardness of roll rubber | 25 degrees |
| Feeding speed of tape | 200 mm/minute |
| Cleaning time | 3 seconds |

The condition of contact on the surface of the produced cleaning tape (contact area of abrading particles) is explained. The results of the comparison test are shown in Table 5.

TABLE 5

| | Particles (number/surface) | Scratches (number/surface) | Tape contact area (%) |
|---|---|---|---|
| Test Example 1 | 10 | 20 | 75-85 |
| Test Example 2 | 5 | 10 | 70-80 |
| Test Example 3 | 5 | 8 | 70-80 |
| Comparison Example 1 | 148 | 175 | 60-70 |
| Comparison Example 2 | 45 | 58 | 40-50 |
| Comparison Example 3 | 50 | 106 | 50-60 |

As shown in Table 5, cleaning tapes of Test Examples 1-3 have significantly different effects compared to cleaning tapes of Comparison Examples 1-3 regarding the remaining number of particles and the number of scratches. Even regarding the contact area of the tape, cleaning tapes of Test Examples are seen as having larger contact areas than those of Comparison Examples.

What is claimed is:

1. A cleaning tape comprising a base tape made of a synthetic resin and a cleaning layer formed on a surface of said base tape, said cleaning layer comprising a binding agent and spherical particles dispersed in said binding agent in a single particle layer, wherein aggregates of a plurality of said spherical particles are formed in said single particle layer and pocket parts with depths about equal to the diameters of said spherical particles are formed between said aggregates such that said pocket parts are scattered in dotted manners within said single particle layer, said pocket parts containing none of said spherical particles.

2. The cleaning tape of claim 1 wherein said spherical particles have an areal density of 50% or more and 80% or less on said surface of said base tape.

3. The cleaning tape of claim 1 wherein said cleaning layer has a thickness which is 1.05 times or more and 1.3 times or less of the average diameter of said spherical particles.

4. The cleaning tape of claim 1 wherein said spherical particles are 0.1 μm or more and 200 μm or less in diameter.

5. The cleaning tape of claim 1 wherein said cleaning layer, containing said spherical particles and said binding agent, contains said spherical particles at a ratio of 50 weight % or more and 80 weight % or less.

6. The cleaning tape of claim 1 wherein said spherical particles are organic and/or inorganic particles.

7. A method of producing a cleaning tape comprising a base tape made of a synthetic resin and a cleaning layer formed on a surface of said base tape, said method comprising the steps of:

forming said cleaning layer by coating said base tape with a coating solution containing an organic solvent and spherical particles in a binding agent such that said spherical particles are dispersed to form a single particle layer; and causing said spherical particles to move inside said coating solution to form aggregates inside said single particle layer and to harden said aggregates such that said single particle layer in said cleaning layer comes to contain pocket parts formed between said aggregates of said spherical particles formed in said single particle layer and that said pocket parts have depths about equal to the diameters of said spherical particles and are scattered in dotted manners within said single particle layer, said pocket parts containing none of said spherical particles.

8. The method of claim 7 wherein said spherical particles are contained at a ratio of 55 weight % or more and 80 weight % or less of the sum of said binding agent and said spherical particles, and said binding agent and said spherical particles have a total concentration of 25 weight % or less in said coating solution.

* * * * *